G. C. BUELL.
Velocipede.
No. 90,723.
Patented June 1, 1869.
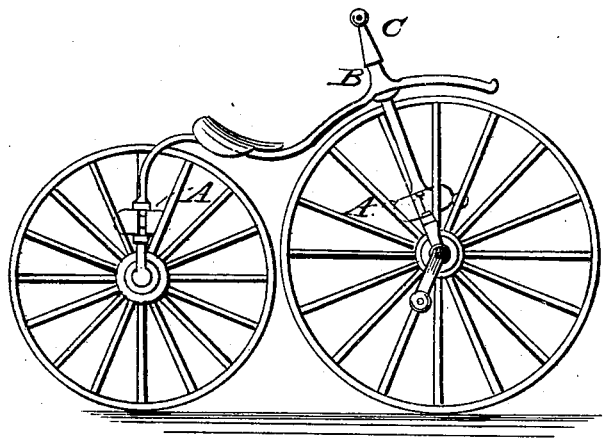
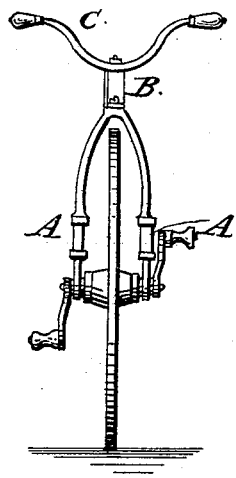

United States Patent Office.

GEORGE C. BUELL, OF NEW HAVEN, CONNECTICUT.

Letters Patent No. 90,723, dated June 1, 1869.

IMPROVEMENT IN VELOCIPEDE.

The Schedule referred to in these Letters Patent and making part of the same.

*To all whom it may concern:*

Be it known that I, GEORGE C. BUELL, of New Haven, in the county of New Haven, in the State of Connecticut, have invented a new and useful Improvement on a Velocipede; and I do hereby declare that the following is a full, clear, and exact description thereof, reference being had to the accompanying drawing, and to the letters of reference marked thereon.

The nature of my invention consists in providing a velocipede with springs, A, upon the uprights rising from the axles of the machine, for the purpose of adapting these vehicles to rough travel.

The usefulness of this improvement will be apparent to any person who has ever attempted riding a velocipede on the street. If the track is rough and uneven, the machine is almost incapable of propulsion, and the riding of the same rendered very annoying from incessant jerks and a continual "shaking up," which jerks or shocks also seriously impair the efficacy of the machine in a few months of out-door usage.

The advantages gained by my Invention are twofold:

First, when obstructions are encountered, they can be passed much more readily, and with less shock, when the machine is provided with a spring in this manner, than when provided with the ordinary spring, for the reason that less weight has to be "lifted" at the immediate time of the encounter, owing to the elasticity and location of the spring, thus making the vehicle much more comfortable to the rider, and much easier of propulsion.

Second, in the ordinary velocipede the shock from an obstruction is transmitted, through rigid material, to every part of the vehicle except the very saddle on which the rider sits, which shocks are very severe upon the bearing B, in which the tiller C runs, (the most important part of a good machine.) This objection is entirely remedied by placing the spring between the bearings of the wheels and the tiller-bearing—the basis of my invention—thus materially lengthening the life of the velocipede.

In view of these two facts, I base my claim upon the invention of a method by which velocipedes are better adapted to rough travel than when supplied with a spring, the sole object of which is to relieve the rider's body.

I do not claim the invention of a velocipede, nor of a spring, but the application of a spring to a velocipede, in the manner and for the purpose set forth.

What I claim as my invention, and desire to secure by Letters Patent, is—

The application to velocipedes of either a flat, spiral, or other kind of spring, of any shape or form whatsoever, to the supports, rising from the axle of either or both wheels, for the purpose set forth and described.

GEO. C. BUELL.

Witnesses:
EBENEZER GILBERT,
GEO. R. CHAMBERLIN.